(12) United States Patent
Hedrick et al.

(10) Patent No.: US 11,975,290 B2
(45) Date of Patent: May 7, 2024

(54) CYCLOPROPENEIMINES FOR CAPTURE AND TRANSFER OF CARBON DIOXIDE

(71) Applicants: International Business Machines Corporation, Armonk, NY (US); The Trustees of Columbia University in the City of New York, New York, NY (US)

(72) Inventors: James L. Hedrick, Pleasanton, CA (US); Nathaniel H. Park, San Jose, CA (US); Luis M. Campos, New York, NY (US); Dino Wu, New York, NY (US); Daniel Malinowski, New York, NY (US)

(73) Assignees: International Business Machines Corporation, Armonk, NY (US); The Trustees of Columbia University in the City of New York, New York, NY (US)

( * ) Notice: Subject to any disclaimer, the term of this patent is extended or adjusted under 35 U.S.C. 154(b) by 114 days.

(21) Appl. No.: 17/655,206

(22) Filed: Mar. 17, 2022

(65) Prior Publication Data

US 2023/0294042 A1    Sep. 21, 2023

(51) Int. Cl.
*B01D 53/62*    (2006.01)
*B01D 53/14*    (2006.01)
*B01D 53/78*    (2006.01)

(52) U.S. Cl.
CPC ......... *B01D 53/62* (2013.01); *B01D 53/1475* (2013.01); *B01D 53/1493* (2013.01); *B01D 53/78* (2013.01); *B01D 2252/2053* (2013.01); *B01D 2257/504* (2013.01)

(58) Field of Classification Search
None
See application file for complete search history.

(56) References Cited

U.S. PATENT DOCUMENTS

| | | |
|---|---|---|
| 4,372,888 A | 2/1983 | Hjelmeland |
| 8,658,016 B2 | 2/2014 | Lakkaraju et al. |
| 10,844,016 B2 | 11/2020 | Werner et al. |

(Continued)

FOREIGN PATENT DOCUMENTS

| | | |
|---|---|---|
| CN | 106606993 B | 12/2018 |
| FR | 2253051 B1 | 2/1979 |

(Continued)

OTHER PUBLICATIONS

Bruns et al., "Synthesis and Coordination Properties of Nitrogen(I)-Based Ligands." Angew. Chem. Int. Ed. 2010, 49, 3680-3683.*

(Continued)

*Primary Examiner* — Daniel Berns
(74) *Attorney, Agent, or Firm* — Kelsey M. Skodje

(57) ABSTRACT

A process, composition, and apparatus for carbon dioxide ($CO_2$) sequestration are disclosed. The process includes passing air containing the $CO_2$ through a cyclopropeneimine (CPI)-functionalized material. The composition includes a CPI-functionalized material that reacts with $CO_2$ when mixed with air containing the $CO_2$. The apparatus includes a component for providing a CPI-functionalized material and mixing the material with $CO_2$ gas.

8 Claims, 13 Drawing Sheets

(56) References Cited

U.S. PATENT DOCUMENTS

| | | | |
|---|---|---|---|
| 2008/0053613 A1* | 3/2008 | Wang | B29C 66/12464 |
| | | | 156/331.1 |
| 2013/0230442 A1 | 9/2013 | Wei et al. | |

FOREIGN PATENT DOCUMENTS

| | | |
|---|---|---|
| WO | 2012169909 A1 | 12/2012 |
| WO | 2013059118 A1 | 4/2013 |

OTHER PUBLICATIONS

Ammann, J., "High-performance Adsorber for Adsorption Heat Pumps," a thesis submitted to attain the degree of Doctor of Sciences of Eth Zurich, 2018, 136 pgs.

Bandar et al., "Cyclopropenimine-Catalyzed Enantioselective Mannich Reactions of tert-Butyl Glycinates with N-Boc-lmines," DOI: 10.1021/ja407277a, J. Am. Chem. Soc. 2013, 135, 32, 11799-11802.

Bandar et al., "Enantioselective Brønsted Base Catalysis with Chiral Cyclopropenimines," DOI: 10.1021/ja3015764, J. Am. Chem. Soc. 2012, 134, 12, 5552-5555.

Bui et al., "Carbon capture and storage (CSS): the way forward," Energy Environ. Sci., 2018, 11, 1062, 115 pgs.

Cantu et al., "Integrated Solvent Design for CO2 Capture and Viscosity Tuning," Science Direct, Energy Procedia 114 (2017) 726-734.

Custelcean, R., "Iminoguanidines: from anion recognition and separation to carbon capture," Chem. Commun., 2020, DOI: 10.1039/D0CC04332J, 24 pgs.

Engel et al., "A Platform for Analysis of Nanoscale Liquids with an Array of Sensor Devices Based on Two-Dimensional Material," DOI: 10/1021/acs/nanolett/6b03561, © 2017 American Chemical Society, pp. 2741-2746.

International Energy Agency, "Energy Technology Perspectives 2020," 400 pgs.

Itagaki et al., "Catalytic synthesis of silyl formates with 1 atm of CO2 and their utilization for synthesis of formyl compounds and formic acid," Journal of Molecular Catalysis A: Chemical, vol. 366, Jan. 2013, pp. 347-352 (abstract only).

Kortunov et al., "In Situ Nuclear Magnetic Resonance Mechanistic Studies of Carbon Dioxide Reactions with Liquid Amines in Mixed Base Systems: The Interplay of Lewis and Bronstead Basicities," energy&fuels, https://pubs.acs.org, doi: 10.102/acs.energyfuels.5b00988, Aug. 6, 2015, 23 pgs.

List of IBM Patents or Patent Applications Treated as Related, Mar. 14, 2022, 2 pgs.

Liu et al., "Insight into Capture of Greenhouse Gas (CO2) based on Guanidinium Ionic Liquids," Chin J. Chem. Phys. 27, 144 (2014), https://doi.org/10/1063/1674-0068/27/02/144-148, 6 pgs.

Murata et al., "Synthesis of silyl formates, formamides, and aldehydes via solvent-free organocatalytic hydrosilylatio bf CO2," https://pubs.rsc.org/en/content/articlelanding/2020/cc/d0cc01371d/unauth, Chemical Communications, Apr. 15, 2020, 5 pgs. (abstract only).

Nacsa et al., ,"Higher-Order Cyclopropenimine Superbases. Direct Neutral Brønsted Base Catalyzed," Michael Reactions with α-Aryl Esters, J Am Chem Soc. Aug. 19, 2015; 137(32): 10246-10253, Published online Aug. 4, 2015. doi: 10.1021/jacs.5b05033.

Notz et al., "Selection and Pilot Plant Tests of New Absorbents for Post-Combustion Carbon Dioxide Capture," DOI: 10.1205/cherd06085, Trans IChemE, Part !, Apr. 2007, 6 pgs.

Seo et al., "Guanidinium-based Organocatalyst for CO2 Utilization under Mild Conditions," DOI: 10/1002/bkcs.11672, Bull. Korean Chem. Soc 2019, 4 pgs.

Serdyuk et al., "Synthesis and Properties of Fluoropyrroles and Their Analogues," Synthesis 2012, 44, 2115-2137, Advanced online publication: 9.06.20120039-78811437-210X, DOI: 10.1055/s-0031-1289770; Art Id: SS-2012-E0307-R.

Voice et al., "Oxidation of amines at absorber conditions for CO2 capture from flue gas," Science Direct, Energy Procedia 4 (2011) 171-178.

Yoshida et al.,"Substituent Dependence of Imidazoline Derivatives on Capture and Release System of Carbon Dioxide," DOI: 10.1039/C7NJ03133E, Oct. 25, 2017, 9 pgs.

Zheng et al., "A single-component water-lean post-combustion CO2 capture solvent with exceptionally low operational heat and total costs of capture—comprehensive experimental and theoretical evaluation," Energy Environ. Sci. 2020, 13, 4106, 8 pgs.

List of IBM Patents or Patent Applications Treated as Related, Aug. 24, 2022, 2 pgs.

Campos et al, "Cyclopropenimines for Mineralization of Carbon Dioxide," U.S. Appl. No. 17/821,046, filed Aug. 19, 2022, 29 pages.

Hedrick et al., "Cyclopropeneimines for Capture and Transfer of Carbon Dioxide," U.S. Appl. No. 17/655,198, filed Mar. 17, 2022, 31 pages.

Koech et al., "Reinventing design principles for developing low-viscosity carbon dioxide binding organic liquids (CO2BOLs) for flue gas clean up," Chemistry & Sustainability, ChemSusChem 10.1002/cssc.201601622, First published: Dec. 21, 2016, 9 pgs, https://doi.org/10.1002/cssc.201601622.

Li et al., "A robust metal organic framework for dynamic light-induced swing adsorption of carbon dioxide," Chem. Eur. J. 10.1002/chem.201602671, First published: Jun. 8, 2016, 6 pgs, http://dx.doi.org/10.1002/chem.201602671.

Malhotra et al., "Directed Hydrogen Bond Placement: Low Viscosity Amine Solvents for CO2 Capture," ACS Sustainable Chemistry and Engineering, Publication Date (Web): Mar. 15, 2019, 27 pages, DOI: 10.1021/acssuschemeng.8b05481.

Meng, Xiaocai, et al., "Guanidinium-based dicarboxylic acid ionic liquids for SO2," First published: Jul. 12, 2016, DOI: 10.1002/jctb.5052, 25 pgs.

Wu et al., "Cyclopropenimines for Activation of Carbon Dioxide," U.S. Appl. No. 17/821,074, filed Aug. 19, 2022, 33 pages.

Wu et al., "Cyclopropenimines for Activation of Carbon Dioxide," U.S. Appl. No. 17/821,094, filed Aug. 19, 2022, 33 pages.

Wu et al., "Universal Reagents for CO2 Capture, Storage, and Upcycling into Value-Added Polymer" [Conference Presentation Abstract] 264th American Chemical Society National Meeting and Exposition, Chicago, IL and Online, Abstract accepted for publication May 26, 2022. https://acs.digitellinc.com/acs/live/28/page/905/1?eventSearchInput=&eventSearchDateTieventSe=&eventSearchDateTimeEnd=&speakerId=201218#sessionCollapse451259, printed Aug. 11, 2022, 1 pg. Grace Period Disclosure.

Puxty et al., "Carbon dioxide post combustion capture: a novel screening study of the carbon dioxide absorption performance of 76 amines," Environ. Sci. Technol. 2009, 43, 16, Suppl. S1-S18, Publication Date: Jul. 17, 2009, 18 pgs, https://doi.org/10.1021/es901376a.

* cited by examiner $k$(2nd order) = 1.51

CYCLOPROPENEIMINES FOR CAPTURE AND TRANSFER OF CARBON DIOXIDE

BACKGROUND

The present disclosure relates to carbon dioxide ($CO_2$) capture and transfer and, more specifically, to cyclopropeneimine compounds for capturing and transferring $CO_2$.

Techniques for capturing atmospheric $CO_2$ (e.g., direct-air-capture (DAC)) can be used to offset $CO_2$ emissions. Current DAC technologies generally involve sorption materials, which can absorb $CO_2$ gas at atmospheric levels and then desorb the gas as an isolated stream in specified intervals. Techniques for transferring and chemically transforming $CO_2$ can be used to produce synthetically useful compounds. For example, captured $CO_2$ may be used as a feedstock in the synthesis of polymeric materials. Upcycling $CO_2$ into useful monomers may also facilitate a shift in production away from standard, fossil fuel intensive approaches that employ highly toxic chemicals, such as phosgene.

SUMMARY

Various embodiments are directed to a process of carbon dioxide ($CO_2$) sequestration. The process includes passing air containing the $CO_2$ through a cyclopropeneimine (CPI)-functionalized material. The air can be passed through a column containing the CPI-functionalized material or mixed with a liquid containing the CPI-functionalized material. The CPI-functionalized material may undergo a phase transition in the presence of the $CO_2$. In some embodiments, the CPI-functionalized material facilitates chemical reactions with the $CO_2$. Further, an external stimulus may be used to release the sequestered $CO_2$.

Further embodiments are directed to a composition that includes a CPI-functionalized material that reacts with $CO_2$ when mixed with air containing the $CO_2$. The composition may include a polymer or polymer network with repeat units having CPI pendent groups. In some embodiments, the composition also includes a solid resin and/or carrier liquid. The CPI-functionalized material may undergo a phase transition in the presence of the $CO_2$.

Additional embodiments are directed to an apparatus, which includes a component for providing a CPI-functionalized material and mixing the material with $CO_2$ gas. The component can be a solid absorption column, a spray tower, a spray dryer, or a trayed absorption column. In some embodiments, the apparatus also includes a component for processing the sequestered $CO_2$, such as by using the CPI-functionalized material to facilitate chemical reactions with the $CO_2$. The apparatus may also include a component for applying an external stimulus to release the $CO_2$.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
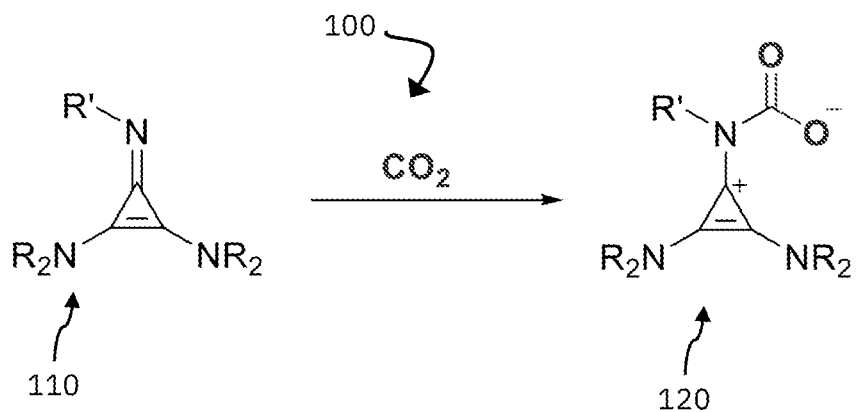
FIG. 1A is a chemical reaction diagram illustrating a process of forming a cyclopropeneimine-carbon dioxide (CPI—$CO_2$) adduct, according to some embodiments of the present disclosure.

While the invention is amenable to various modifications and alternative forms, specifics thereof have been shown by way of example in the drawings, and will be described in detail. It should be understood, however, that the intention is not to limit the invention to the particular embodiments described. Instead, the intention is to cover all modifications, equivalents, and alternatives falling within the spirit and scope of the invention.

DETAILED DESCRIPTION

Embodiments of the present invention are generally directed to direct-air-capture (DAC) of carbon dioxide ($CO_2$) and, more specifically, to cyclopropeneimine compounds for capturing and transferring $CO_2$. While the present disclosure is not necessarily limited to such applications, various aspects of the disclosure may be appreciated through a discussion of examples using this context.

Techniques for reducing atmospheric $CO_2$ are essential for the goal of limiting the global temperature rise to 1.5° C. by 2050. Current emissions at 35 gigatonnes per year (Gt/yr) are expected to rise to ~40-45 Gt/yr by 2050. Point source capture, zero-emission technologies, such as renewables for energy production, and reduced-emission programs are expected to lower emissions (e.g., by about 800-900 Mt/yr). However, these efforts cannot offset $CO_2$ from long distance travel/cargo transport and certain heavy industries (expected to account for 15+% emissions annually), nor can they remove already-emitted $CO_2$ from the atmosphere.

Negative emissions using DAC may overcome these challenges. Current DAC technologies generally involve sorption materials, which can absorb $CO_2$ gas at atmospheric levels and then desorb the gas as an isolated stream in specified intervals. Another advantage of DAC is that captured $CO_2$ may be used as a feedstock in the synthesis of polymeric materials. Upcycling $CO_2$ into useful monomers would also facilitate a shift in production away from standard, fossil fuel intensive approaches that employ highly toxic chemicals, such as phosgene. However, challenges remain in scaling DAC sufficiently. For example, current atmospheric loading of $CO_2$ is a dilute 415 ppm, but the estimated total carbon load in the atmosphere is 900+ Gt. Developing, refining, and scaling DAC to ensure economic viability and carbon neutrality will require new, highly efficient chemical transformations. Embodiments of the present disclosure may be used to overcome these challenges.

Disclosed herein are cyclopropeneimine (CPI)-based molecules and polymers that may be used for upcycling and capture/release of $CO_2$. The disclosed CPIs can be super-basic (e.g., having conjugate acids with $pK_{BH+}$~27-28) due to aromatic stabilization from the cyclopropenium ion. The disclosed CPIs can form adducts with $CO_2$ (CPI—$CO_2$ adducts) and "activate" $CO_2$ for subsequent chemical transformations. In some embodiments, low-energy $CO_2$ release from CPI—$CO_2$ adducts can be accomplished with external stimuli (e.g., mechano- or photochemical activation). Additionally, the disclosed materials may be synthesized on a large scale from readily available, inexpensive substrates and processed into emulsions, membranes, particles, etc. that may be integrated within $CO_2$ reactors. Such materials may enable DAC systems that operate at ambient conditions using localized, renewable energy sources.

Referring now to the drawings, in which like numerals represent the same or similar elements, FIG. 1A is a chemical reaction diagram illustrating a process 100 of forming a CPI—$CO_2$ adduct by reacting a CPI with $CO_2$ gas, according to some embodiments of the present disclosure. The illustrated CPI 110 is a bis(amino)CPI, where R and R' are organic substituents (see below). Herein, "CPI" refers to a bis(amino)CPI unless otherwise indicated. When CPI 110 reacts with $CO_2$, a CPI—$CO_2$ adduct 120 is formed. This reaction may be carried out under ambient conditions. The CPI—$CO_2$ adduct 120 is a zwitterion characterized by an aromatic cyclopropenium (tris(amino)cyclopropenium, or TAC) ion, which can be stabilized by electron-donating amine substituents, and an anionic carbonate moiety. The aromatic stabilization and synthetic modularity of CPIs have enabled their use in catalytic transformations, including Michael additions, Mannich reactions, Wittig rearrangements, and ring-opening polymerization. The cyclopropenium conjugate acids of CPIs have also been utilized as Brønsted acid catalysts in reactions involving additions to oxocarbeniums and hydroamination of alkenes.

Figure 1B:
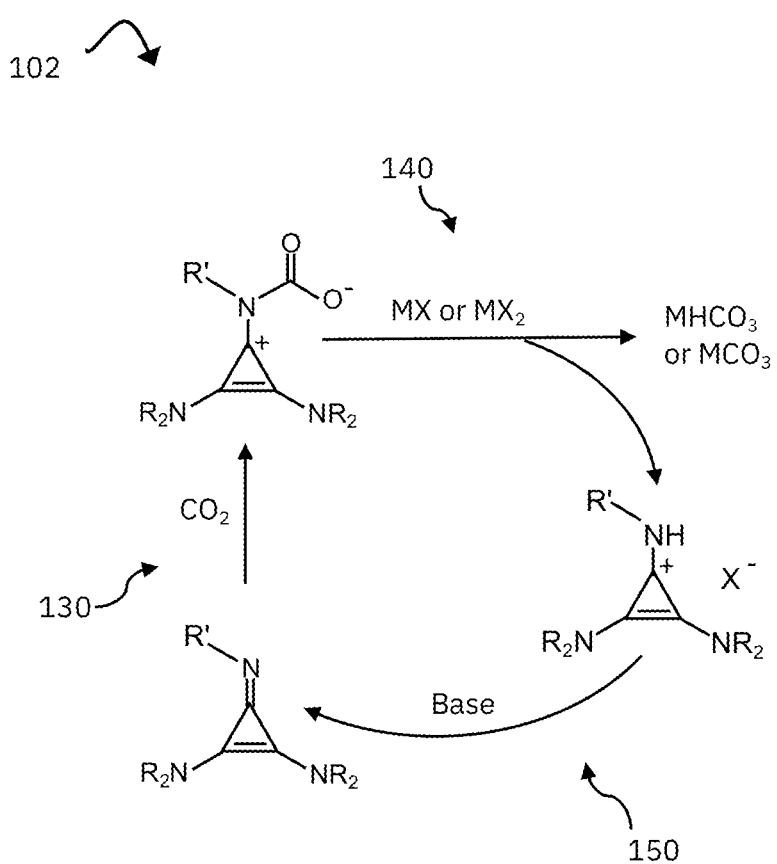
FIG. 1B is a chemical reaction diagram illustrating a process of CPI-facilitated reduction of $CO_2$, according to some embodiments of the present disclosure.

FIG. 1B illustrates a process 101 of CPI-facilitated reduction of $CO_2$, according to some embodiments of the present disclosure. Process 102 includes mineralization of $CO_2$ and may be used to recycle the CPI. For example, large-scale processes may be used for DAC and/or conversion of $CO_2$ into more useful chemical species. In process 102, the CPI (e.g., CPI 110) is reacted with $CO_2$ to form the CPI—$CO_2$ adduct. This is illustrated at operation 140. At operation 150, the adduct is mixed with a metal halide (MX or $MX_2$), such as a metal chloride where M is sodium, potassium, magnesium, calcium, etc. For example, MX may be NaCl, and $MX_2$ may be $MgCl_2$ or $CaCl_2 \cdot 2H_2O$ in some embodiments. This results in formation of a CPI conjugate acid (CPI—$H^+$) halide ($X^-$) and a bicarbonate ($MHCO_3$) or carbonate ($MCO_3$). For example, sodium bicarbonate ($NHCO_3$) can form when MX is NaCl, calcium carbonate ($CaCO_2$) can form when $MX_2$ is $CaCl_2 \cdot 2H_2O$, and magnesium carbonate ($MgCO_3$) can form when $MX_2$ is $MgCl_2$. The solid (bi)carbonate can be removed from the mixture by filtration. At operation 150, CPI—$H^+$ can be converted back to the free-base CPI via basification. For example, a base such as ammonium hydroxide can be added to the solution. The CPI can be isolated as a solid and/or reacted with additional $CO_2$ (at operation 130).

An experimental example of process 102 was carried out using a CPI with cyclohexyl R groups and n-butyl R' groups. However, it should be understood that CPI-facilitated $CO_2$ mineralization may be carried out using other CPIs, metal halides, solvents, reaction scales, etc. The CPI was suspended in acetonitrile ($CH_3CN$) and exposed to air containing ~4% $CO_2$ (e.g., the amount of $CO_2$ in exhaled air). This resulted in formation of the zwitterionic CPI—$CO_2$ adduct, which is soluble in $CH_3CN$. This solution was mixed with brine (aqueous NaCl) in a "Solvay" process, resulting in a mixture of CPI—$H^+$ chloride and sodium bicarbonate ($NaHCO_3$). The sodium bicarbonate was filtered and dried, and the CPI—$H^+$ chloride was worked-up with ammonium hydroxide to provide the free-base CPI. This CPI was isolated as a solid.

Figure 2:
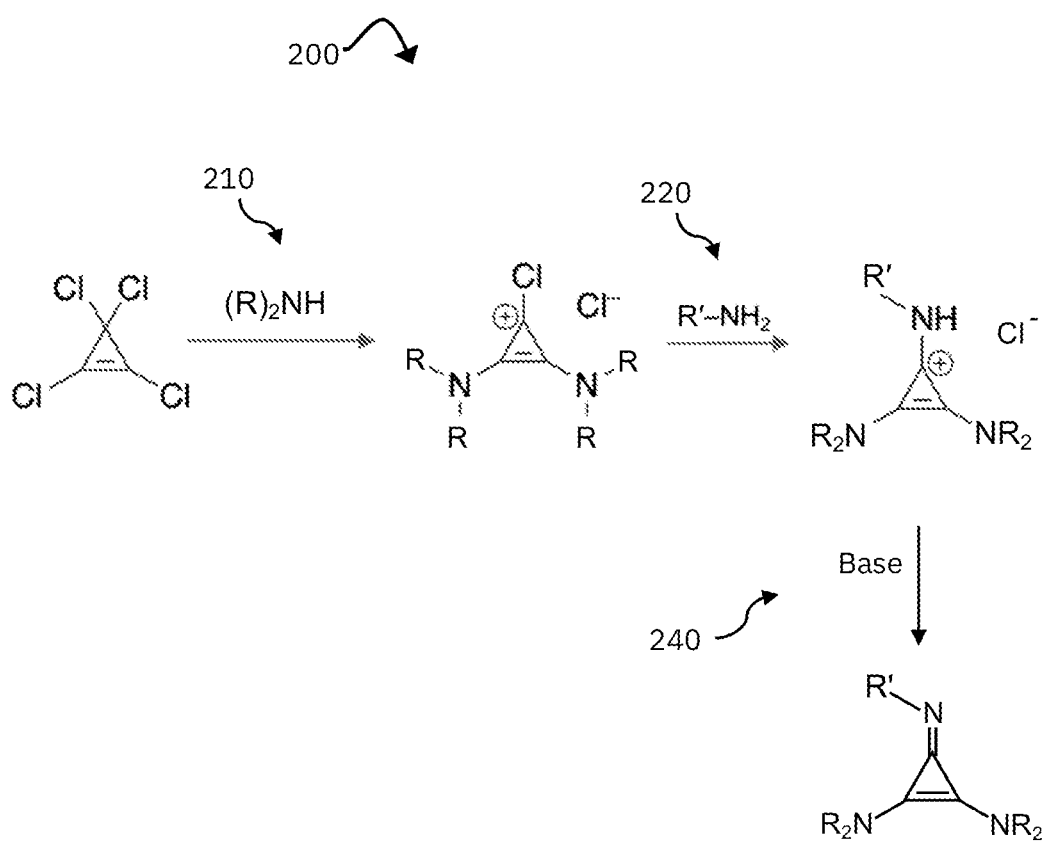
FIG. 2 is a chemical reaction diagram illustrating a process of forming CPIs, according to some embodiments of the present disclosure.

FIG. 2 illustrates a process 200 of forming CPIs such as CPI 110 (FIG. 1A), according to some embodiments of the present disclosure. Process 200 can involve a first step 210 wherein tetrachlorocyclopropene is reacted with a secondary amine $R_2NH$ (e.g., dicyclohexylamine, where R=cyclohexyl ("Cy")) in a solvent such as dichloromethane (DCM). In a second step 220, the resulting diamine chloride salt can be reacted with a primary amine R'—$NH_2$ to form a CPI conjugate acid (CPI—$H^+$) chloride. In a third step 240, basification of CPI—$H^+$ yields the CPI. The ability to vary R and R' groups based on secondary and primary amine selection provides modularity to the CPI core by allowing tuning of parameters such as reactivity, solubility, etc. Examples and effects of R and R' groups are discussed in greater detail below.

Figure 3:
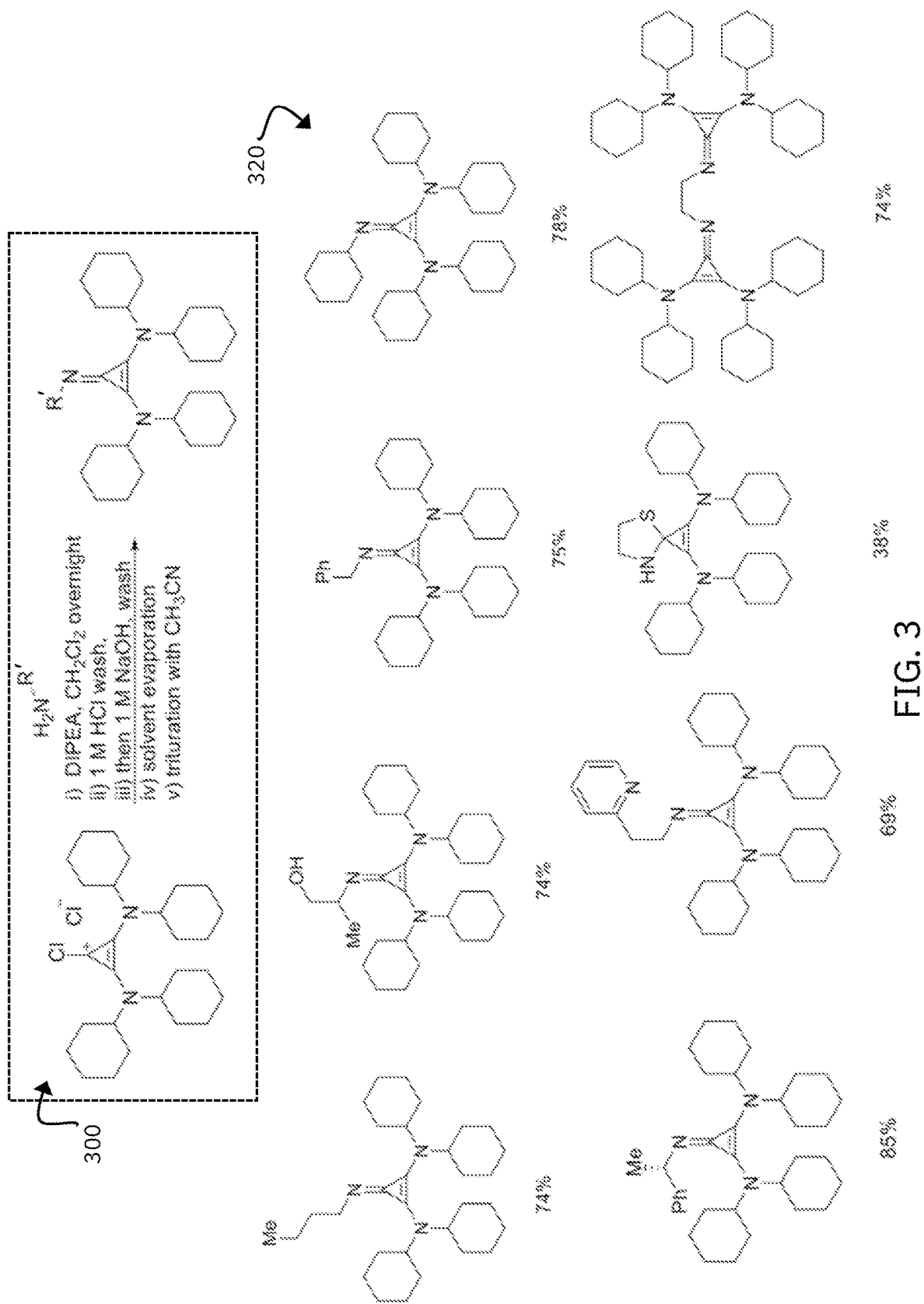
FIG. 3 illustrates experimental examples of a process of CPI formation, according to some embodiments of the present disclosure.

FIG. 3 illustrates experimental examples of a process 300 of CPI formation, according to some embodiments of the present disclosure. In this example, a diamine was mixed with a selected primary amine (R'-NH$_2$) and N,N'-diisopropylethylamine (DIPEA) in dichloromethane (CH$_2$Cl$_2$) and allowed to react overnight (e.g., step 220 of process 200). The reaction mixture was then washed with 1 M HCl, followed by basification with 1 M NaOH to convert the conjugate acid CPI—H$^+$ (not shown) into the CPI (e.g., step 240 of process 200). Process 300 was repeated using different R'-NH$_2$ reactants under substantially similar reaction conditions in order to form a series of CPIs 320, which are illustrated in FIG. 3 with their corresponding percent yields. Herein, "Me" represents a methyl group, and "Ph" represents a phenyl group.

Figure 4A:
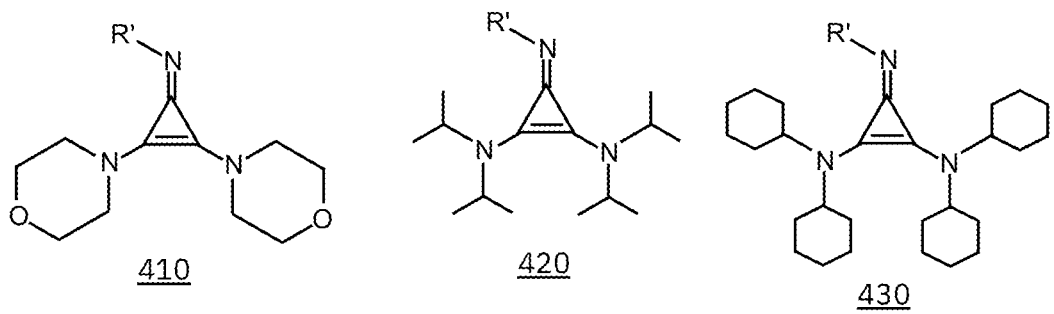
FIG. 4A is a chemical structure diagram illustrating CPIs with a series of R groups, according to some embodiments of the present disclosure.

FIG. 4A illustrates structures 400 of CPIs with a series of R groups, according to some embodiments of the present disclosure. The R groups can be modified to tune solubility, basicity, stability, etc. For example, CPI 410, which has morpholino R groups, may be more soluble than CPI 420 and CPI 430, which respectively have isopropyl and cyclohexyl R groups. Further, the R groups may be modified to induce twisting of the plane between the cyclopropene ring and the —NR$_2$ moieties due to steric interactions. This may impact the basicity and reactivity of the CPIs. The R' group of CPIs 410-430 can be any appropriate organic substituent (see, e.g., FIGS. 3, 4B, and 6A).

Figure 4B:
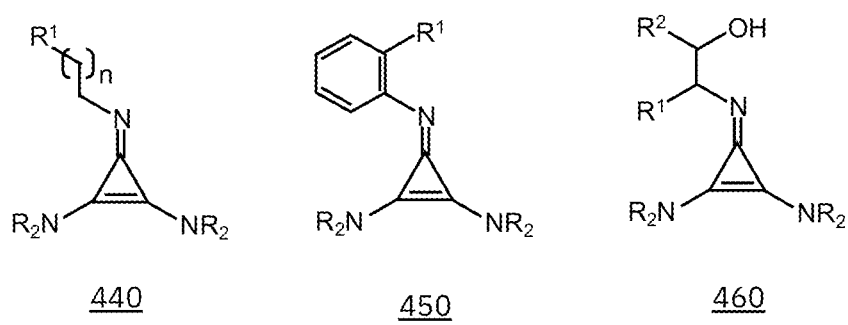
FIG. 4B is a chemical structure diagram illustrating CPIs with a series of R' groups, according to some embodiments of the present disclosure.
Figure 4B:
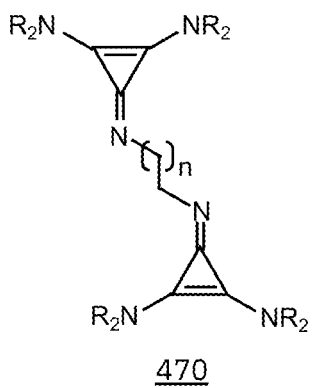

FIG. 4B illustrates structures 401 of CPIs with a series of R' groups, according to some embodiments of the present disclosure. The R' groups of CPI 440 and CPI 450, respectively, include linear alkyl and cyclic aromatic moieties. The R' group of CPI 460 includes an alcohol moiety. In CPIs 440-460, R$^1$ and R$^2$ can, independently, be hydrogen atoms or any appropriate reactive or unreactive functional groups. The R' groups can be modified to tune interactions with CO$_2$. For example, when R' includes an alcohol moiety (e.g., CPI 460 or CPIs 440/450 when R$^1$ has hydroxyl group), a synergistic effect on CO$_2$ capture analogous to alcohol-containing guanidine and amidine systems may be conferred. The effect of R' groups on reactivity are discussed in greater detail with respect to FIGS. 6A and 6B. The R groups of CPIs 440-470 can be any appropriate organic substituents (see, e.g., FIG. 4A).

Figure 5A:
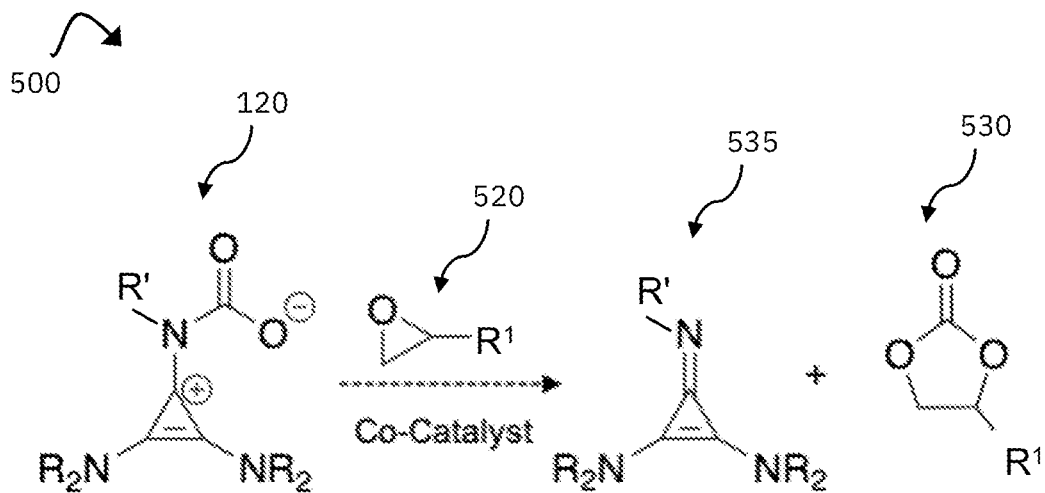
FIG. 5A is a chemical reaction diagram illustrating a process of synthesizing a 5-membered cyclic carbonate using a CPI—$CO_2$ adduct 120 as a source of $CO_2$, according to some embodiments of the present disclosure.

FIG. 5A illustrates a process 500 of synthesizing a 5-membered cyclic carbonate using a CPI—CO$_2$ adduct 120 as a source of CO$_2$, according to some embodiments of the present disclosure. In some embodiments, process 500 can be carried out under ambient conditions (e.g., approximately room temperature and pressure). The adduct 120 provides CO$_2$ that can react with an epoxide 520 in the presence of a co-catalyst (e.g., a halogen salt). The epoxide 520 has an R$^1$ group that can be any appropriate functional group/substituent (e.g., substituents having aliphatic linear, branched, cyclic, and/or aromatic moieties, optionally with one or more heteroatoms and/or reactive functional group). This reaction results in a cyclic 5-membered carbonate species 530.

In some embodiments, the CPI—CO$_2$ adduct 510 can be mixed with the epoxide 520 and the co-catalyst in a shared reaction vessel. The resulting reaction produces a 5-membered carbonate product 530 and CPI byproduct 535. The CPI byproduct 535 of this reaction may be recovered via salt formation or extraction following separation of the carbonate compound 530. In other embodiments, a two-chamber reactor with a shared headspace for gas exchange can be used. In these instances, CO$_2$ can be released by the CPI—CO$_2$ adduct 120 in a first chamber and react with a mixture of the epoxide 520 and co-catalyst in a second chamber. Using a two-chamber reactor in process 500 may allow reuse of CPI 535 in further CO$_2$ capture without requiring separation from the reaction mixture as in a shared vessel. Further, a two-chamber reactor may prevent potential undesirable reactivity between the carbonate compound 530 and CPI 535.

Figure 5B:
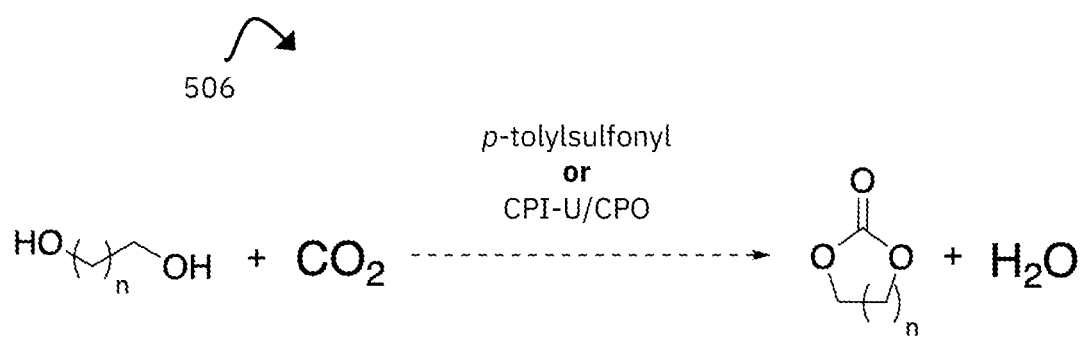
FIG. 5B is a chemical reaction diagram illustrating a process of synthesizing cyclic carbonates using organocatalytic condensation, according to some embodiments of the present disclosure.
Figure 5B:
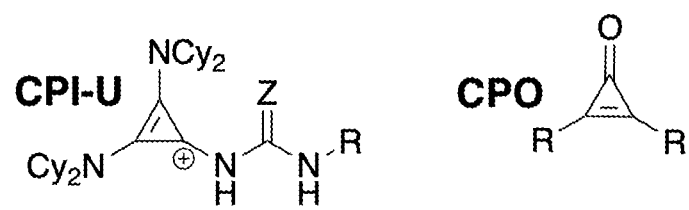

FIG. 5B illustrates a process 506 of synthesizing cyclic carbonates using organocatalytic condensation, according to some embodiments of the present disclosure. Process 506 can be carried out in a two-chamber reactor, as discussed with respect to FIG. 5A. This can prevent ring-opening/oligomerization side reactions that may occur when 6-membered or larger cyclic carbonates are formed. CO$_2$ released from a CPI—CO$_2$ adduct (e.g., adduct 120, which is not illustrated in FIG. 5B) in a first chamber can enter the headspace of a second chamber. The second chamber can contain a diol with the formula HO(CH$_2$)$_n$CH$_2$OH, where n is an integer greater than or equal to 1. For example, the diol can be a 1,3-diol (n=2) or 1,5-diol (n=4) for synthesizing 6-membered or 8-membered rings, respectively.

In some embodiments, the diol in process 506 is in a reaction mixture with p-tolylsulfonyl chloride as an activator. In these instances, the reaction mixture may also include tetramethylethylenediamine (TMEDA) and triethylamine (not shown). Experimental results including this TMEDA/triethylamine mixture have shown faster reaction times and prevention of ring-opening/oligomerization reactions. In other embodiments, process 506 may be modified to eliminate stoichiometric tosylate salt waste that can form in CO$_2$/diol reactions.

For example, a dual urea-modified CPI (CPI—U)/cyclopropenone (CPO) catalyst system can be used to enable the condensation between the diol and CO$_2$ for cyclic carbonate formation. In the illustrated structure of CPI—U, Z can be oxygen or sulfur. In this context, the modularity of CPIs can be utilized again by converting the CPI into a Brønsted acid/hydrogen bond donor (HBD) instead of a Brønsted base. This may allow the CPI-based HBD (CPI—U or analogs thereof, such as analogs where cyclohexyl(Cy) is replaced by another R group) to activate CPO and facilitate acetal formation under mild conditions. The resulting cyclic CPO acetal can then react in the presence of the same CPI—U catalyst and CO$_2$ to form a cyclic carbonate. In some embodiments, carrying out this process under ambient or near ambient temperatures can be done without requiring removal of as much water from the system than processes involving high-temperature condensation reactions form carbonates from acetals or diols.

Figure 6A:
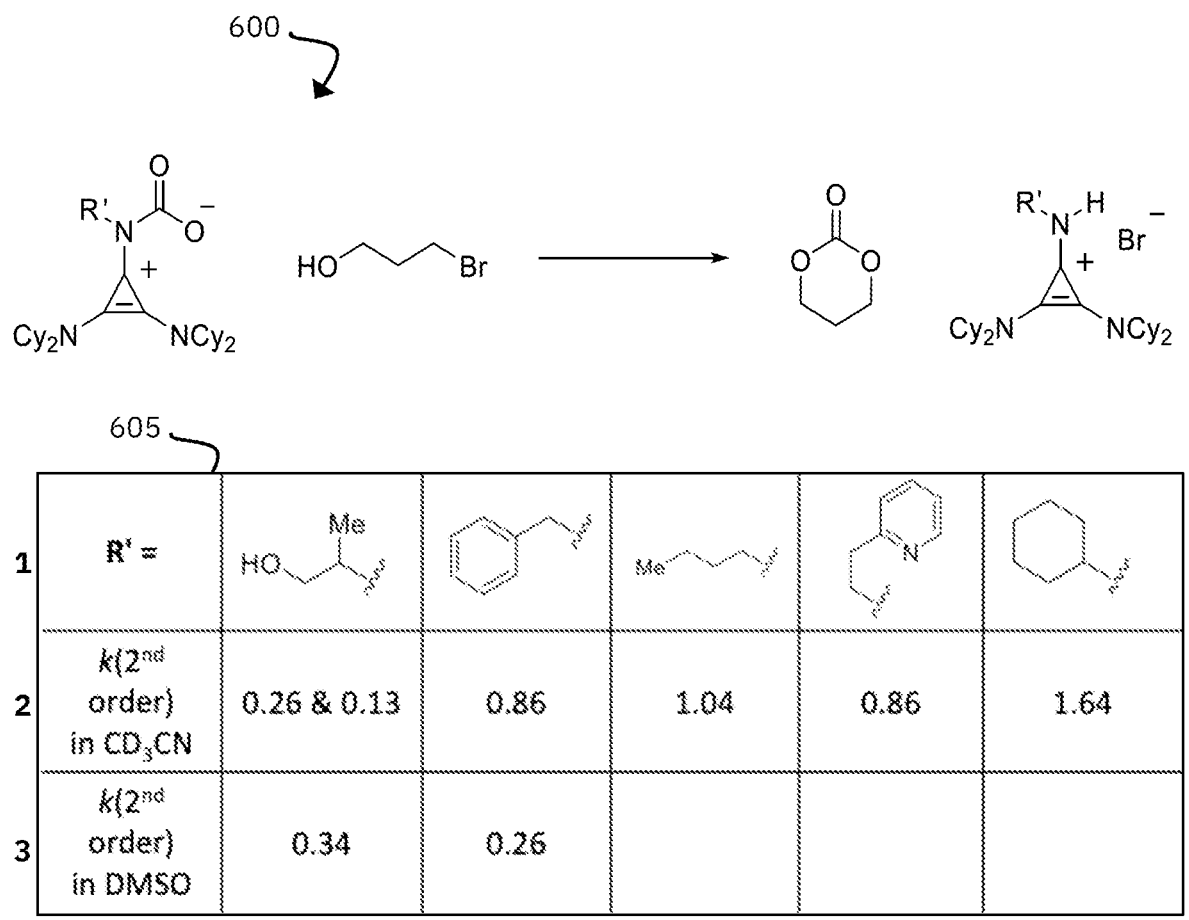
FIG. 6A illustrates experimental results measuring the effect of R' on formation of carbonates, according to some embodiments of the present disclosure.

FIG. 6A illustrates experimental results measuring the effect of R' on formation of carbonates, according to some embodiments of the present disclosure. A process 600 of reacting a CPI—CO$_2$ adduct (where R is cyclohexyl(Cy)) with 1-bromo-3-propanol to form trimethylene chloride was monitored in order to determine second order rate constants k (M$^{-1}$s$^{-1}$). Process 600 was repeated using CPI—CO$_2$ adducts with different R' groups. The R' groups used are illustrated in table 605 (row 1) along with corresponding rate constants measured in deuterated acetonitrile (CD$_3$CN, row 2) and dimethylsulfoxide (DMSO, row 3). Compounds formed in these reactions can be used to synthesize a variety of compounds. For example, the reaction monitored using CPI where R' is cyclohexyl(rightmost column, 1.64 M$^{-1}$s$^{-1}$ in CD$_3$CN) produces trimethylene carbonate, which can be used to form block polymers with glycolic acid that are used in polymeric positive temperature coefficient (PPTC) devices.

Figure 6B:
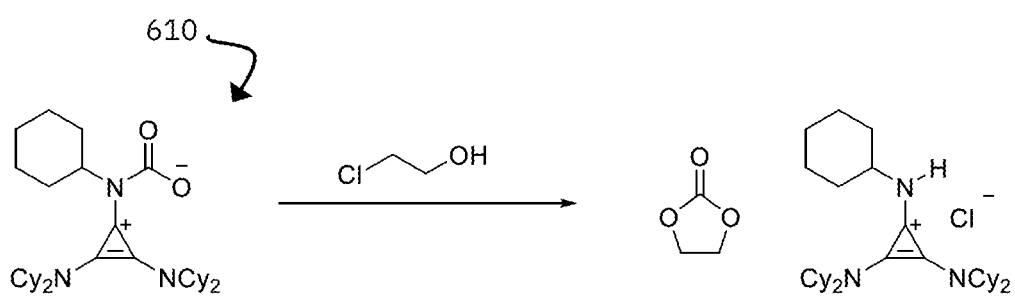
FIG. 6B is a chemical reaction diagram illustrating a process of reacting a CPI—$CO_2$ adduct with 2-chloroethanol to form a cyclic carbonate, according to some embodiments of the present disclosure.

FIG. 6B illustrates a process 610 of reacting a CPI—$CO_2$ adduct with 2-chloroethanol to form a cyclic carbonate, according to some embodiments of the present disclosure. The CPI—$CO_2$ adduct in process 610 has cyclohexyl R and R' groups. In process 610, the reaction between the illustrated CPI—$CO_2$ adduct and 2-chloroethanol to form the cyclic carbonate was determined to have a second order rate constant of 1.51 $M^{-1}s^{-1}$. The reaction between this adduct and 3-bromo-1-propanol to form the cyclic carbonate was monitored in process 600 (FIG. 6A) and was determined to have a second order rate constant of 1.64 $M^{-1}s^{-1}$ (table 605, rightmost column).

Figure 7:
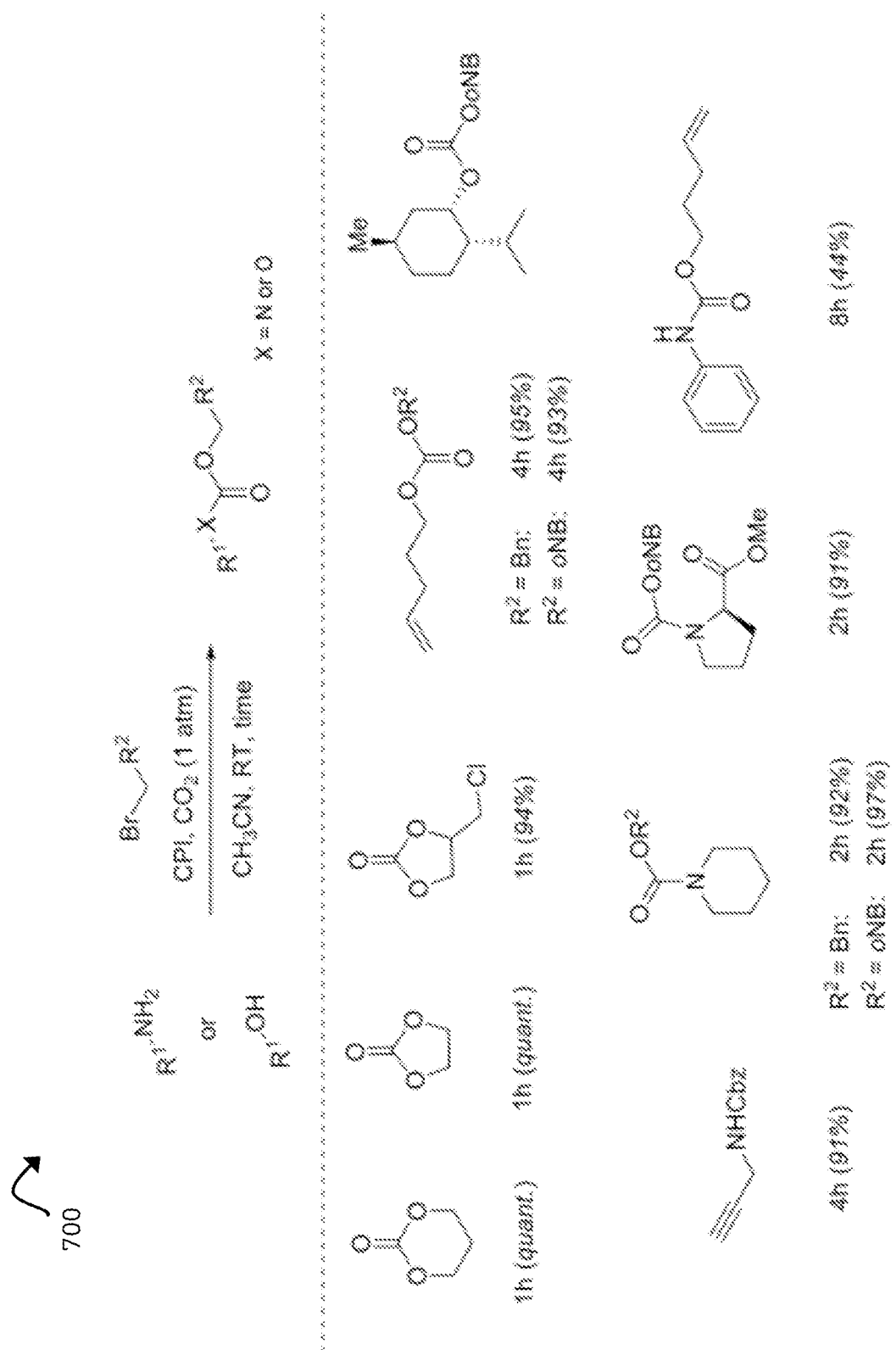
FIG. 7 illustrates a process of forming carbonates and carbamates using CPI—$CO_2$ adducts and product yields obtained from experimental examples thereof, according to some embodiments of the present disclosure.

FIG. 7 illustrates a process 700 of forming carbonates and carbamates using CPI—$CO_2$ adducts and product yields obtained from experimental examples thereof, according to some embodiments of the present disclosure. CPI and $CO_2$ gas can form a CPI—$CO_2$ adduct that reacts with an alcohol (HO—R') or amine ($H_2$N-R') and an organohalide (e.g., Br-$R^2$) to form a carbonate (where X=O) or a carbamate (where X=N), respectively. Experimental examples of this reaction were carried out at room temperature (RT) in acetonitrile ($CH_3CN$) using $1 \times 10^5$ (1 atm) $CO_2$ and a CPI, where R is cyclohexyl and R' is n-butyl. The reaction times varied and are indicated below corresponding product structures in FIG. 7. The percent yields of each product are also indicated below the corresponding structures in FIG. 7. As will be understood by persons of ordinary skill, the identities of the illustrated products depend upon the identities of $R^1$, $R^2$, and X in the selected reactants. Herein, the abbreviations Bn, oNB, and Cbz represent benzyl, ortho-nitrobenzyl, and carbonyloxybenzyl groups, respectively.

Figure 8:
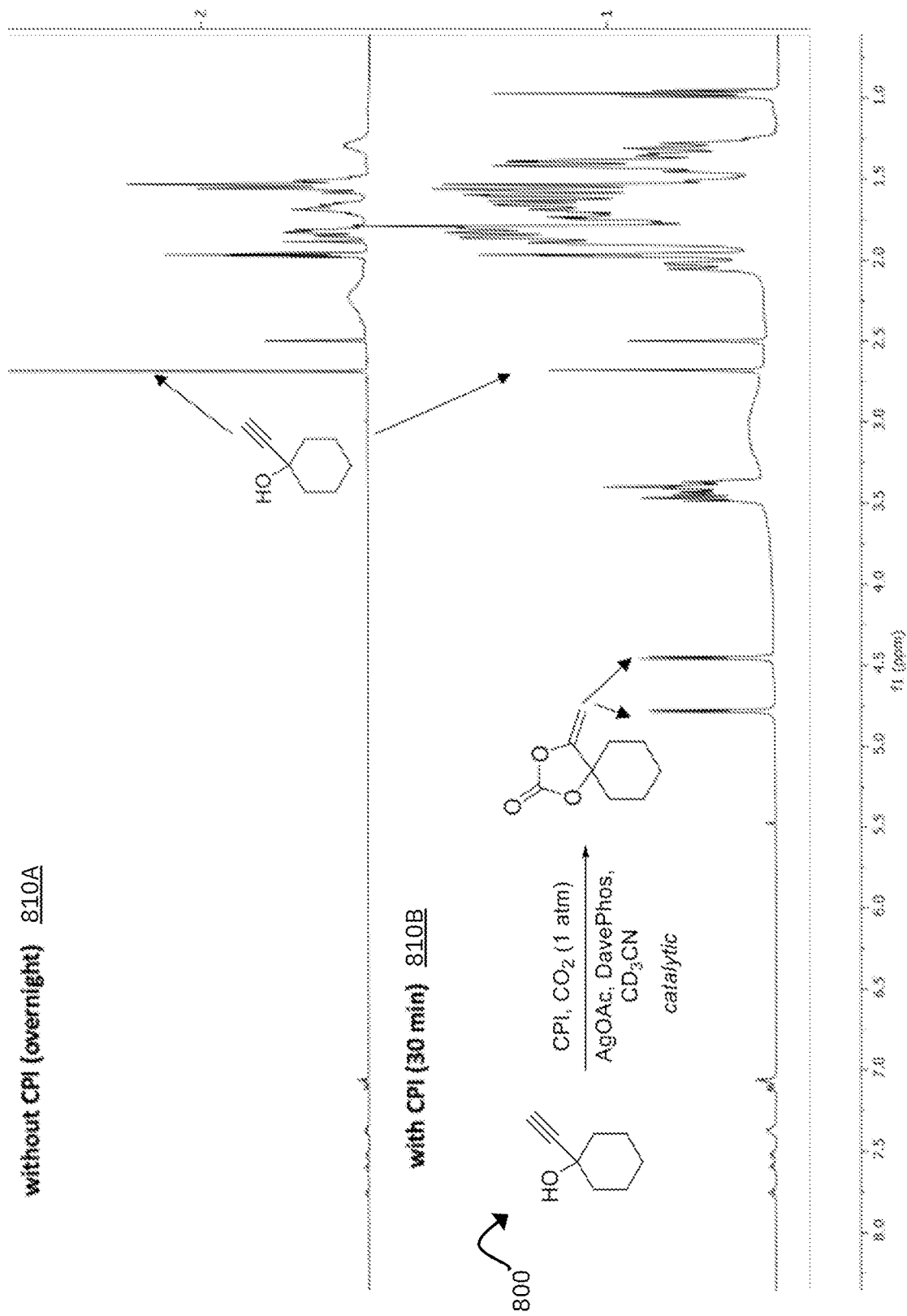
FIG. 8 illustrates $H^1$—NMR spectra obtained from experimental reactions involving propargyl groups, according to some embodiments of the present disclosure.

In some embodiments, CPI and $CO_2$ can catalytically cyclize propargyl functional groups. An experimental example of this reaction (process 800) is shown in FIG. 8. FIG. 8 illustrates $H^1$—NMR spectra 810A and 810B obtained from reactions with 1-ethynylcyclohexanol, according to some embodiments of the present disclosure. To obtain both NMR spectra 810A and 810B, $CO_2$ was added to reaction mixtures that included 1-ethyncyclohexanol, silver acetate (AgOAc), and DavePhos (2-Dicyclohexylphosphino-T-(N,N-dimethylamino)biphenyl) in $CD_3CN$. Spectrum 810A illustrates the solution obtained after leaving the mixture overnight. This mixture did not include CPI, and no cyclization was observed in the NMR spectrum 810A.

However, when the reaction included CPI(NMR spectrum 810B), about 50% conversion of the 1-ethyncyclohexanol to the cyclized product was observed after thirty minutes. NMR spectrum 810B shows the product of process 800, wherein CPI(R=cyclohexyl and R'=n-butyl) is used to cyclize a propargyl alcohol moiety on 1-ethyncyclohexanol with $CO_2$. Selected $H^1$—NMR peaks characteristic of 1-ethyncyclohexanol and the cyclized product are indicated by arrows in FIG. 8.

Figure 9:
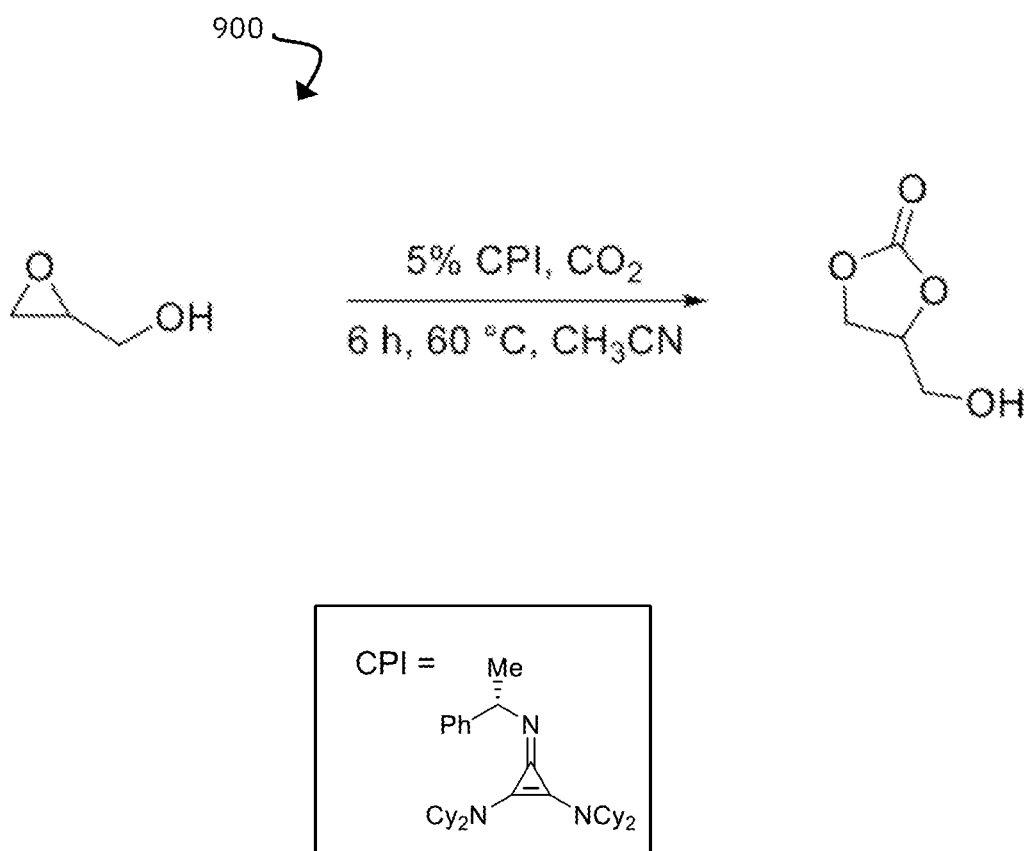
FIG. 9 is a chemical reaction diagram illustrating a process of catalytic cyclization using alcohol-derivatized epoxides, according to some embodiments of the present disclosure.

FIG. 9 illustrates a process 900 of catalytic cyclization using alcohol-derivatized epoxides, according to some embodiments of the present disclosure. The illustrated experimental example of process 900 was carried out using a 5% solution of the illustrated CPI mixed with glycidol in acetonitrile at about 60° C. $CO_2$ was added to the reaction mixture and the isolated product of the reaction after about six hours was 94% glycerol 1,2-carbonate. Process 900 can be carried out using different epoxides, CPIs, and/or reaction conditions in some embodiments. Catalytic ring-expansion of epoxides using CPI/$CO_2$ can be used to generate a variety of heterocyclic compounds.

In some embodiments (not shown), a silane may be reduced using a CPI—$CO_2$ adduct formed by reacting $CO_2$ gas with a CPI (e.g., 4% CPI in acetonitrile). For example, a room temperature reaction between triphenyl silane and a CPI—$CO_2$ adduct can catalytically produce triphenylsilyl formate. Additional reactions can be carried out using silyl formates to form synthetically useful compounds. For example, triphenylsilyl formate can react with an amine to produce a formamide species (e.g., converting piperidine to N-formylpiperidine). In further embodiments (not shown), CPI may react with $CS_2$ gas to form an adduct (CPI—$CS_2$) that may be used to form compounds such as dithiocarbamates and dithiocarbonates. Compounds such as these may be used as RAFT (radical addition-fragmentation chain-transfer polymerization) agents and/or radical initiators.

Figure 10A:
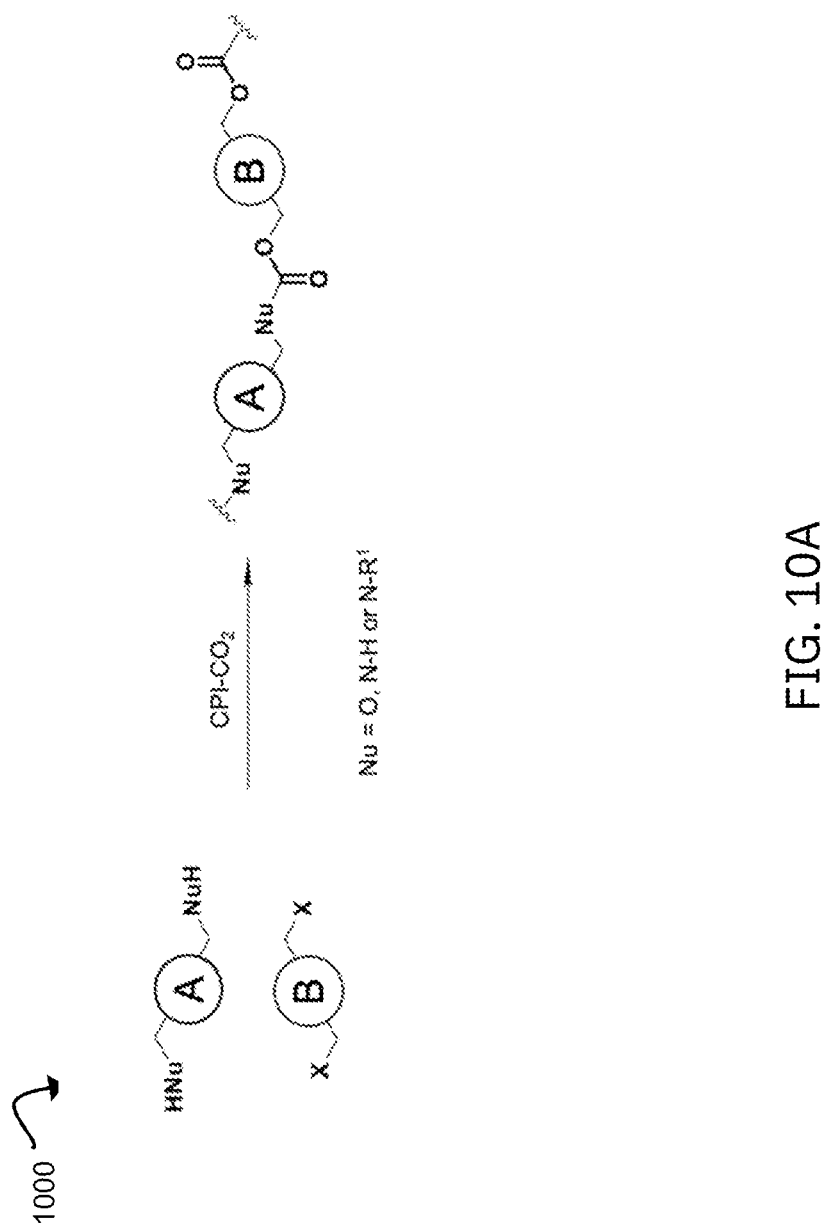
FIG. 10A is a chemical reaction diagram illustrating a generic process of polymerization involving CPI—$CO_2$ adducts, according to some embodiments of the present disclosure.

FIG. 10A illustrates a generic process 1000 of polymerization involving CPI—$CO_2$ adducts, according to some embodiments of the present disclosure. In process 1000, a CPI—$CO_2$ adduct (e.g., adduct 120) acts as a stoichiometric source of $CO_2$ to form a polycarbonate or a polyurethane. Herein, the abbreviation Nu represents a nucleophile, such as O, NH, or N—$R^1$ ($R^1$=an organic substituent). That is, —NuH may be a hydroxyl group (—OH), a primary amine (—$NH_2$), or a secondary amine (—$NHR^1$). When Nu=O, the product of process 1000 can be a polycarbonate. When Nu=NH or $NR^1$, the product of process 1000 can be a polyurethane. The portions of these compounds labeled A and B can include any appropriate organic moieties, the selection of which may be based on their reactivity with the CPI—$CO_2$ adduct, desired properties of the polymer product, etc.

Figure 10B:
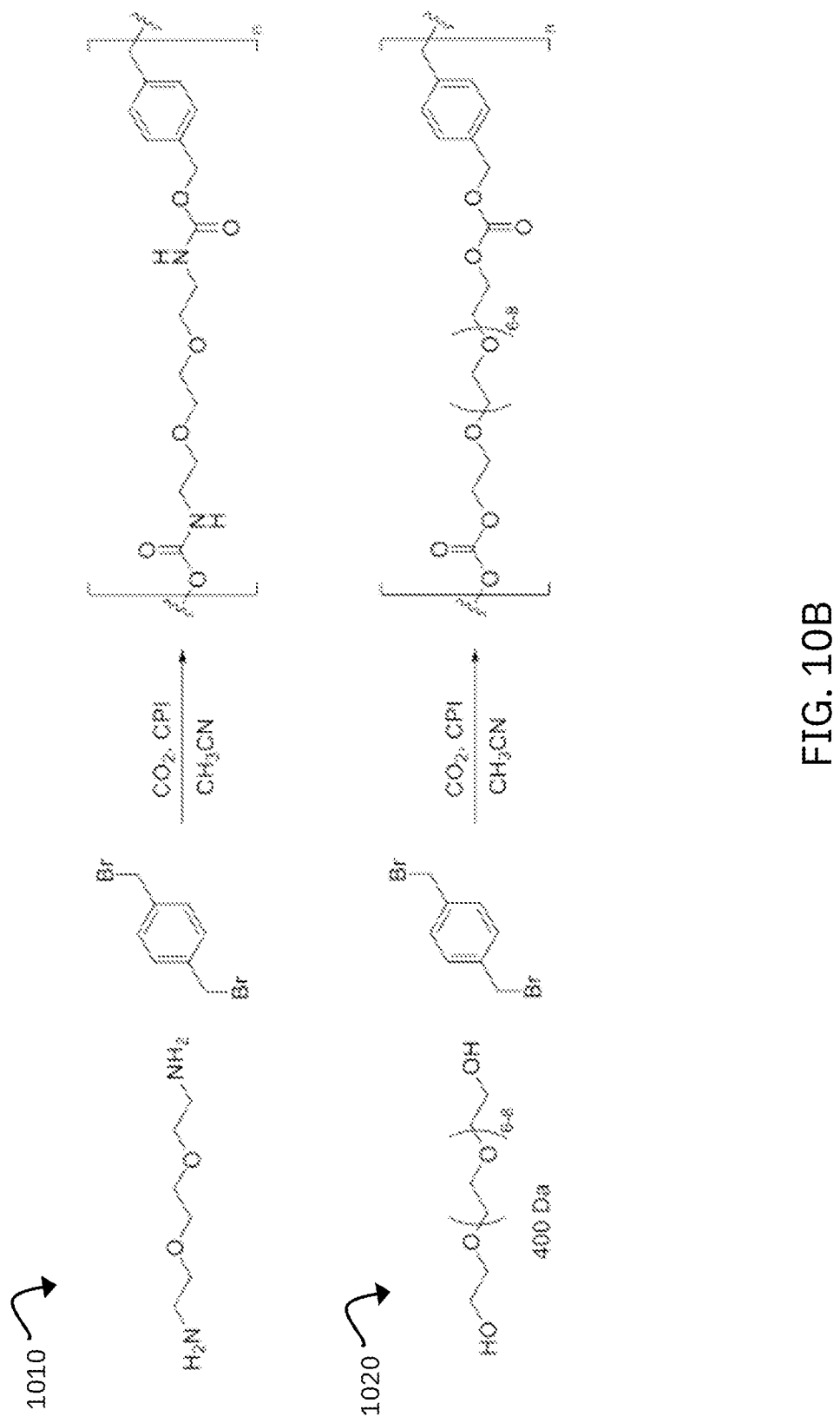
FIG. 10B is a chemical reaction diagram illustrating processes of polymerization involving CPI—$CO_2$ adducts, according to some embodiments of the present disclosure.

FIG. 10B illustrates processes 1010 and 1020 of polymerization involving CPI—$CO_2$ adducts, according to some embodiments of the present disclosure. Processes 1010 and 1020 are examples of reactions represented by the generic process 1000 illustrated in FIG. 10A. In process 1010, the CPI—$CO_2$ adduct reacts with 1,8-diamino-3,6-dioxaoctane (amino-PEG2-amine) and 1,4-bis(bromomethyl)benzene in acetonitrile to form polyurethane (where n is an integer greater than 1). In process 1020, the CPI—$CO_2$ adduct reacts with ~400 Da polyethylene glycol and 1,4-bis(bromomethyl)benzene in acetonitrile to form polycarbonate (where n is an integer greater than 1).

Further embodiments can include polymers containing CPI and/or tris[amino]cyclopropenium (TAC) pendent groups. These polymers can be formed using polymerizable building blocks containing pendent CPIs and TAC ions. In other embodiments, CPI and/or TAC pendent groups may be added post-polymerization. A wide variety of polymers may be synthesized with these pendent groups, such as polycarbonates, polystyrenes, polymethylmethacrylates, polymethacrylates, polyethers, polyesters, epoxide resins, polyamines, etc.

In some embodiments, CPI-functionalized methacrylate polymers can be formed by reacting amine functionalized methacrylates or methacrylamides with various chloro-CPI precursors (e.g., compound 215 of FIG. 2) to generate an array of methacrylate CPI salts. For example, TAC monomers can be formed using a primary amine R'-$NH_2$ (e.g., primary amine 220 of process 200) where R' includes a methacrylate moiety. TAC monomers may undergo polymerization and copolymerization by a variety of reversible deactivation radical polymerization (RDRP) reactions.

Figure 11:
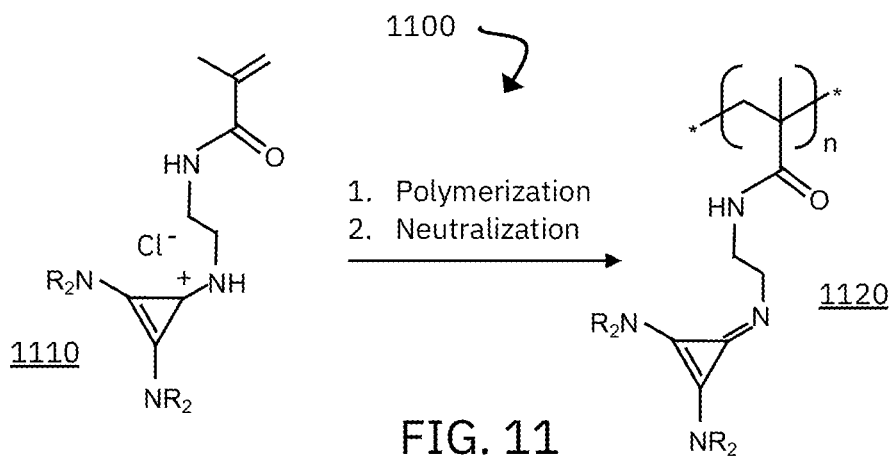
FIG. 11 is a chemical reaction diagram illustrating a process of forming a CPI-functionalized polymethacrylate, according to some embodiments of the present disclosure.

FIG. 11 illustrates a process 1100 of forming a CPI-functionalized polymethacrylate, according to some embodiments of the present disclosure. In this example, a TAC monomer 1110 is provided. The TAC monomer has a TAC ion moiety and can be formed, for example, in process 200 using 2-aminoethylmethacrylamide. The TAC monomer 1110 can be polymerized (e.g., via RDRP) and, following polymerization, neutralized to the free-base CPI. This yields a CPI polymer 1120. While FIG. 11 illustrates a homopolymer 1120, the TAC monomer 1110 can be copolymerized with other monomers, such as methacrylates having various functional groups. This can allow CPI reactivity to be tuned by utilizing the effects of neighboring pendent groups (e.g., hydroxyl groups).

Figure 12:
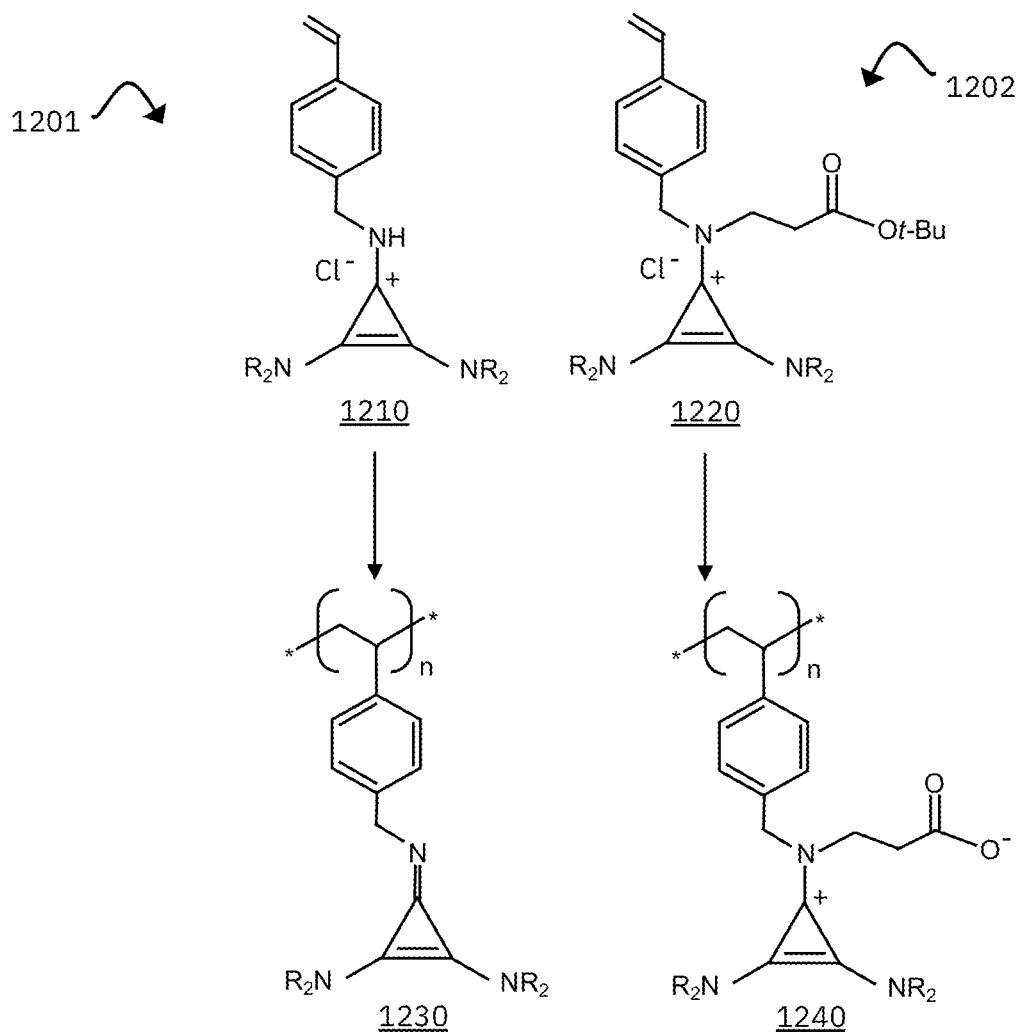
FIG. 12 is a chemical reaction diagram illustrating processes of forming CPI-functionalized polystyrenes, according to some embodiments of the present disclosure.

FIG. 12 illustrates two processes 1201 and 1202 of forming CPI-functionalized polystyrenes, according to some embodiments of the present disclosure. Processes 1201 and 1202 begin with styrene-TAC monomers 1210 and 1220, respectively. Polymerization of these monomers affords corresponding cationic TAC-functionalized polystyrenes (not shown), which can be neutralized by basification to yield CPI-functionalized polystyrenes 1230 (process 1201) and 1240 (process 1202). In process 1202, deprotection of the TAC t-butyl ester results in a zwitterionic polystyrene 1240.

In further embodiments, a series of CPI-functionalized styrene monomers may be produced and used to generate solid phase resins that may be incorporated into continuous capture and transformation processes.

Figure 13:
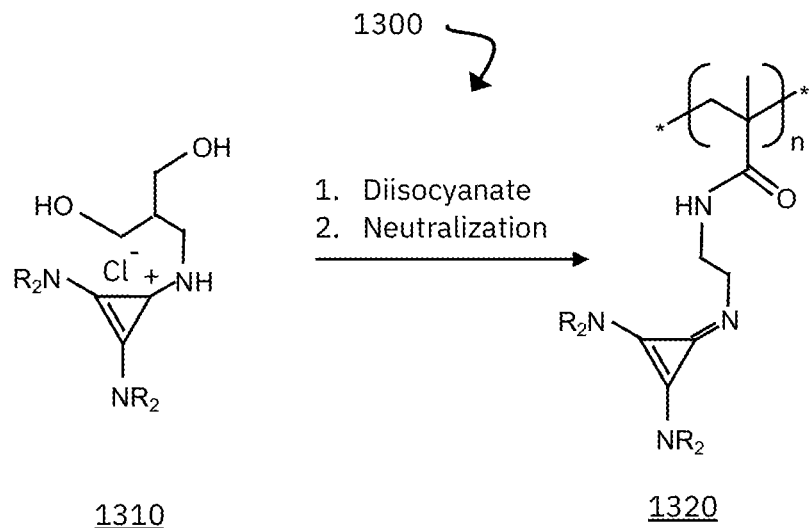
FIG. 13 is a chemical reaction diagram illustrating a process of forming CPI-functionalized polyurethanes, according to some embodiments of the present disclosure.

FIG. 13 illustrates a process 1300 of forming CPI-functionalized polyurethanes, according to some embodiments of the present disclosure. In some embodiments, aminoalcohols can be used to form TAC-diol monomers 1310 for organocatalyzed polyadditions, providing CPI-functionalized polyurethanes 1320 following neutralization. For example, serinol can be reacted with a chloro-CPI to form the TAC-diol monomer 1310 illustrated in FIG. 13. Polyaddition with a diisocyanate can afford a corresponding TAC-functionalized polyurethane (not shown). Neutralization by addition of a base can result in the illustrated CPI-functionalized polyurethane 1320. Polymerizations of TAC-diol monomers can be accomplished as homogeneous solutions, as emulsions or suspensions, or in bulk. In some embodiments, crosslinking agents can be used to form various CPI-functionalized polyurethanes. Using techniques such as these, TAC-diols can be used as building blocks for polymer precipitates, crosslinked polymer beads, or high surface area polymeric foams using conventional synthetic methodologies.

A wide variety of CPI-functionalized materials can be made using polymers and polymer networks with these pendent groups. In some embodiments, the polymers can be multi-functional polymers for capturing $CO_2$ and either transforming the $CO_2$ into new chemicals or releasing it through external stimuli. Copolymerization of the building blocks (e.g., monomers or oligomers) with other functional monomers can be used to tune both $CO_2$ uptake and processability of the final polymers. Various macromolecular architectural considerations may also be used for tuning these properties. Examples of polymer architectures may include linear, branched, dendritic, bottle brush, surface-grafted, etc. Techniques for automated polymerization, high-throughput characterization, predictive modeling, etc. may be employed to facilitate selection of material compositions. Through selection of monomers/oligomers used in these processes, both homogeneous and segmented morphologies can be generated, allowing control over air permeation, modulus, hydrophilic/hydrophobic balance, and other key structural features.

In some embodiments, the polymers with pendent CPIs and/or TAC ion derivatives can be processed in modular architectures such as particles, suspensions, membranes, gels, etc. CPI and/or TAC monomers/small molecules and oligomers may also be used to functionalizes materials such as these in some embodiments. For example nano- or microparticles can be formed from polymers with CPI/TAC pendent groups and/or surface-functionalized with CPI molecules. CPI surfactants may be used as coatings as well. These materials can be used to sequester and upcycle $CO_2$.

Additionally, CPI-functionalized materials can provide various platforms for releasing the $CO_2$ gas in response to a stimulus. In some embodiments, $CO_2$ may be thermally released from CPI—$CO_2$ adducts. However, lower-energy release methods may be used as well. For example, the polymers may be used to form hydroxide-impregnated materials used for moisture-swing capture/release. Moisture-swing DAC uses water to preferentially displace $CO_2$ in the form of a carbonate and can have low energy-input when ambient heat is used to regenerate the dehydrated state of the polymer material.

In another example, photoredox catalysis may be used as a low-energy release mechanism of $CO_2$ through simple light-irradiation (e.g., with visible and/or ultraviolet light). In these instances, polymer CPI—$CO_2$ adducts can be irradiated in the presence of a photoredox catalyst, which can destabilize the adducts via single-electron transfer processes and cause release of the $CO_2$. This decarboxylation may also be used in tandem with photoredox-catalyzed carboxylation of various organic compounds.

Additionally, mechanical/mechanochemical force may be used to promote release of $CO_2$ and regeneration of the free-base CPI in some embodiments. For example, sonication of the polymer adducts can induce bond scission of labile N—C bonds between CPI and $CO_2$. Other techniques for N—C bond scission known to persons of ordinary skill may be used as well, such as appropriate chemical reactions.

Figure 14:
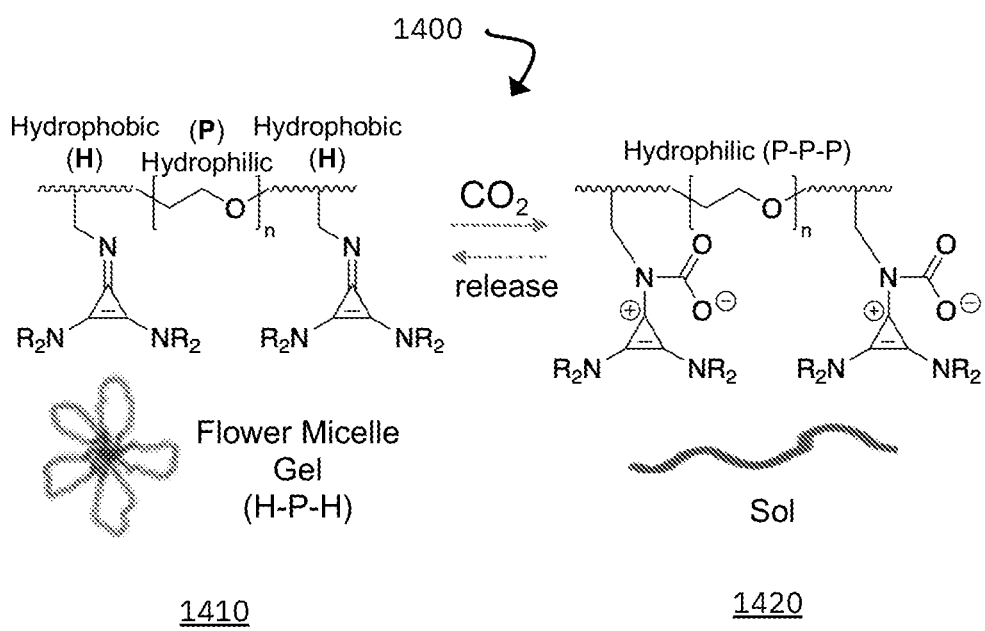
FIG. 14 illustrates a sol-gel $CO_2$ capture/release process involving a triblock copolymer with CPI pendent groups, according to some embodiments of the present disclosure.

In the transformation from CPI—$CO_2$ adduct to CPI+$CO_2$, the polymers change from a polar zwitterionic form to a non-polar neutral free-base form. This chemical change may be used to drive macromolecular phase transformations reversibly induced by $CO_2$ capture and release. For example, phase transitions of ABA triblock copolymers having hydrophobic A-blocks derived from CPI and a center B-block derived from hydrophilic polymers may be used. An example of this is illustrated in FIG. 14. These triblock copolymers can be prepared from difunctional hydrophilic blocks. In some embodiments, the R-groups on CPI can be used to drive phase changes. For example, morpholine-substituted CPIs are likely to be hydrophilic, and may therefore be used as the mid-block in order to increase the number of $CO_2$ capture sites within the entire triblock.

FIG. 14 illustrates a sol-gel $CO_2$ capture/release process 1400 involving a triblock copolymer with CPI pendent groups, according to some embodiments of the present disclosure. As described above, the illustrated polymer 1410 has a triblock ABA configuration with hydrophobic CPI A-blocks (H) and hydrophilic B blocks (P). The frustrated outer hydrophobic blocks fold back to form a hydrophobic pocket or "flower-like" micelle. Above ~3-5% concentration in an aqueous solution, mild agitation can cause the hydrophobic chains to interdigitate, thereby connecting the micelles and producing a hydrogel. As shown in FIG. 14, $CO_2$ capture by passing air through the gel 1410 can cause a phase-change from a gel to a sol 1420. This is because the CPI—$CO_2$ adduct is hydrophilic and its formation causes unfolding of the micelles. The sol copolymer 1420 can be captured and converted back to 1410 upon release of the $CO_2$.

Various types of apparatus may be used in mediating absorption for DAC. For example, CPI-polymer materials for $CO_2$ capture/transfer may be employed in a packed bead reactor, trayed adsorption column, spray tower, spray dryer, etc. (see below). Techniques for gas-liquid mass transfer known to those of ordinary skill may be employed, and parameters such as flow rates, temperatures, concentrations, residence times, packing or tray types, nozzle design, droplet size (in spray methods) can be tuned.

In a packed bead reactor, there can be an absorption column that uses polymeric micro- and/or nanoparticles as a CPI-functionalized solid support resin. The absorption column can be packed with CPI-functionalized particles, and a $CO_2$-containing gas phase (e.g., atmospheric gas) can be passed through the column until $CO_2$ breakthrough is observed. Following the $CO_2$ exposure, the column can be detached, regenerated, and the gas released using techniques such as those discussed above (e.g., by photoredox/irradiation, mechanical force such as sonication, etc.). In some embodiments, CPI-functionalized particles are formed using CPI-styrene monomers behaving as surfactants. In these instances, polymerization with a core derived from a hydrophobic styrene and various concentrations of divinylbenzene (DVB), can generate highly crosslinked particles by miniemulsion polymerization.

In a trayed absorption column, a $CO_2$-containing gas can be continually introduced at the bottom of the column while a $CO_2$-absorbing liquid, which includes a CPI-functionalized small-molecule or polymer solution, is introduced at the top of the column. As the gas and liquid phases mix in the column, the gas can percolate on trays positioned in the column to allow sufficient residence time for gas absorption into the liquid phase. The scrubbed gas can then be collected at the top of the column, and the CPI—$CO_2$-containing liquid can be collected at the bottom of the column for further downstream processing (e.g., including upcycling and/or release of the captured $CO_2$).

A spray tower can utilize an aqueous solution or emulsion of a CPI-functionalized polymer or CPI small molecules. This CPI-containing liquid can be sprayed from the top of the tower into a $CO_2$-containing gas. As in the trayed absorption column, the solution containing the captured $CO_2$ (CPI—$CO_2$ adducts) can then be collected at the bottom for further downstream processing.

A spray dryer can be similar to the spray tower. For example, a controlled mist of the CPI-containing liquid can be introduced into a tower or column concurrently with $CO_2$-containing air (e.g., heated $CO_2$-containing air). In this configuration, the liquid can be heated to ensure complete evaporation of the liquid phase and produce a solid aerosol and "wet" air. A cyclone separator can be used to disengage the solid material (the small-molecule or polymeric CPI—$CO_2$ adduct) from the flowing air.

Various embodiments of the present disclosure are described herein with reference to the related drawings, where like numbers refer to the same component. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus. Further, the word "providing" as used herein can refer to various actions such as creating, purchasing, obtaining, synthesizing, making available, etc. or combinations thereof.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

Unless otherwise noted, ranges (e.g., time, concentration, temperature, etc.) indicated herein include both endpoints and all numbers between the endpoints. Unless specified otherwise, the use of a tilde (~) or terms such as "about," "substantially," "approximately," "slightly less than," and variations thereof are intended to include the degree of error associated with measurement of the particular quantity based upon the equipment available at the time of filing the application. For example, "about" can include a range of ±8% or 5%, or 2% of a given value, range of values, or endpoints of one or more ranges of values. Unless otherwise indicated, the use of terms such as these in connection with a range applies to both ends of the range (e.g., "approximately 1 g-5 g" should be interpreted as "approximately 1 g-approximately 5 g") and, in connection with a list of ranges, applies to each range in the list (e.g., "about 1 g-5 g, 5 g-10 g, etc." should be interpreted as "about 1 g-about 5 g, about 5 g-about 10 g, etc.").

As discussed above, CPIs and other compounds herein include R groups (e.g., R, R', and $R^x$, where x is an integer), which can be any appropriate organic substituent known to persons of ordinary skill. In some embodiments, the R groups can include substituted or unsubstituted aliphatic groups. As used herein, the term "aliphatic" encompasses the terms alkyl, alkenyl, and alkynyl.

As used herein, an "alkyl" group refers to a saturated aliphatic hydrocarbon group containing from 1 to 20 (e.g., 2 to 18, 2 to 8, 2 to 6, or 2 to 4) carbon atoms. An alkyl group can be straight, branched, cyclic, or any combination thereof. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted with one or more substituents or can be multicyclic as set forth below. Unless specified otherwise, the term "alkyl," as well as derivative terms such as "alkoxy" and "thioalkyl," as used herein, include within their scope, straight chain, branched chain, and cyclic moieties.

As used herein, an "alkenyl" group refers to an aliphatic carbon group that contains from 2 to 20 (e.g., 2 to 18, 2 to 8, 2 to 6, or 2 to 4) carbon atoms and at least one double bond. Like an alkyl group, an alkenyl group can be straight, branched, or cyclic, or any combination thereof. Examples of an alkenyl group include, but are not limited to, allyl, isopropenyl, 2-butenyl, and 2-hexenyl. An alkenyl group can be substituted with one or more substituents as set forth below.

As used herein, an "alkynyl" group refers to an aliphatic carbon group that contains from 2 to 20 (e.g., 2 to 18, 2 to 8, 2 to 6, or 2 to 4) carbon atoms and has at least one triple bond. Like an alkyl group, an alkynyl group can be straight, branched, or cyclic, or any combination thereof. Examples of an alkynyl group include, but are not limited to, propargyl and butynyl. An alkynyl group can be substituted with one or more substituents as set forth below.

The term "alkylthio" includes straight-chain alkylthio, branched-chain alkylthio, cycloalkylthio, cyclic alkylthio, heteroatom-unsubstituted alkylthio, heteroatom-substituted alkylthio, heteroatom-unsubstituted $C_n$-alkylthio, and heteroatom-substituted $C_n$-alkylthio. In some embodiments, lower alkylthios are contemplated.

The term "haloalkyl" refers to alkyl groups substituted with from one up to the maximum possible number of halogen atoms. The terms "haloalkoxy" and "halothioalkyl" refer to alkoxy and thioalkyl groups substituted with from one up to five halogen atoms.

As described herein, compounds of the present disclosure can optionally be substituted with one or more substituents, such as are illustrated generally above, or as exemplified by particular classes, subclasses, and species of the present disclosure. Each substituent of a specific group may further be substituted with one to three of, for example, halogen, cyano, sulfonyl, sulfinyl, carbonyl, oxoalkoxy, hydroxy, amino, nitro, aryl, haloalkyl, and alkyl. For instance, an alkyl group can be substituted with alkyl sulfonyl and the alkyl sulfonyl can be optionally substituted with one to three of halogen, cyano, sulfonyl, sulfinyl, carbonyl, oxoalkoxy, hydroxy, amino, nitro, aryl, haloalkyl, and alkyl.

In general, the term "substituted" refers to the replacement of hydrogen radicals in a given structure with the radical of a specified substituent. Specific substituents are described above in the definitions and below in the description of compounds and examples thereof. Unless otherwise indicated, an optionally substituted group can have a substituent at each substitutable position of the group, and when more than one position in any given structure can be substituted with more than one substituent selected from a specified group, the substituent can be either the same or different at every position. A ring substituent, such as a hetero cycloalkyl, can be bound to another ring, such as a cycloalkyl, to form a spiro-bicyclic ring system, e.g., both rings share one common atom. As one of ordinary skill in the art will recognize, combinations of substituents envisioned by this present disclosure are those combinations that result in the formation of stable or chemically feasible compounds.

Modifications or derivatives of the disclosed compounds are contemplated as being useful with the methods and compositions of the present disclosure. Derivatives may be prepared and the properties of such derivatives may be assayed for their desired properties by any method known to those of skill in the art. In certain aspects, "derivative" refers to a chemically modified compound that still retains the desired effects of the compound prior to the chemical modification.

The descriptions of the various embodiments of the present disclosure have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A $CO_2$-sequestering composition, comprising adducts of sequestered $CO_2$ formed by mixing a cyclopropeneimine (CPI)-functionalized material with $CO_2$-containing air.

2. The composition of claim 1, wherein the CPI-functionalized material comprises a polymer having CPI pendent groups.

3. The composition of claim 2, wherein the polymer is selected from the group consisting of a homopolymer, a random copolymer, and a block copolymer.

4. The composition of claim 2, further comprising a network of polymers.

5. The composition of claim 1, wherein the CPI-functionalized material undergoes a phase transition in the presence of the $CO_2$.

6. The composition of claim 1, wherein the CPI-functionalized material comprises a solid resin.

7. The composition of claim 1, wherein the adducts form in a liquid carrier for the CPI-functionalized material.

8. The composition of claim 1, wherein the CPI-functionalized material is a compound with the following formula:

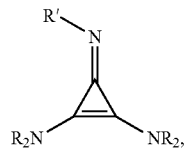

wherein each R and R' is an organic substituent.

* * * * *